(12) United States Patent
Yu

(10) Patent No.: US 8,436,862 B2
(45) Date of Patent: May 7, 2013

(54) METHOD AND SYSTEM FOR ENABLING MANAGED CODE-BASED APPLICATION PROGRAM TO ACCESS GRAPHICS PROCESSING UNIT

(75) Inventor: Meng-Shiue Yu, Taipei (TW)

(73) Assignee: Nvidia Corporation, Santa Clara, CA (US)

( * ) Notice: Subject to any disclaimer, the term of this patent is extended or adjusted under 35 U.S.C. 154(b) by 1181 days.

(21) Appl. No.: 12/333,220

(22) Filed: Dec. 11, 2008

(65) Prior Publication Data

US 2010/0149194 A1    Jun. 17, 2010

(51) Int. Cl.
*G06F 15/80* (2006.01)
*G06F 15/00* (2006.01)
*G06T 1/00* (2006.01)

(52) U.S. Cl.
USPC .......................................... 345/505; 345/501

(58) Field of Classification Search .................. 345/501, 345/502, 505; 717/136, 142, 146, 148
See application file for complete search history.

(56) References Cited

U.S. PATENT DOCUMENTS

| | | | | |
|---|---|---|---|---|
| 2008/0184211 A1* | 7/2008 | Nickolls et al. | ............... | 717/140 |
| 2009/0228904 A1* | 9/2009 | Meijer et al. | .................. | 719/320 |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Ryoo et al., Optimization Principles and Application Performance Evaluation of a Multithreaded GPU Using CUDA, Proceedings of the 13th ACM SIGPLAN Symposium on Principles and Practice of Parallel Programming, pp. 73-82, Feb. 20-23, 2008.*
Moss, et al. "Toward Acceleration of RSA Using 3D Graphics Hardware," LNCS 4887, Dec. 2007, pp. 369-388.

* cited by examiner

*Primary Examiner* — Jacinta M Crawford
(74) *Attorney, Agent, or Firm* — Patterson & Sheridan, LLP

(57) ABSTRACT

One embodiment of the present invention sets forth a method for enabling an intermediate code-based application program to access a target graphics processing unit (GPU) in a parallel processing environment. The method includes the steps of compiling a source code of the intermediate code-based application program to an intermediate code, translating the intermediate code to a PTX instruction code, and translating the PTX instruction code to a machine code executable by the target graphics processing unit before delivering the machine code to the target GPU.

19 Claims, 6 Drawing Sheets

METHOD AND SYSTEM FOR ENABLING MANAGED CODE-BASED APPLICATION PROGRAM TO ACCESS GRAPHICS PROCESSING UNIT

BACKGROUND OF THE INVENTION

1. Field of the Invention

The present invention generally relates to parallel processing, and more particularly, to a method and system for enabling managed code-based application program to access graphics processing unit in a computed unified device architecture (CUDA) environment.

2. Description of the Related Art

Unless otherwise indicated herein, the approaches described in this section are not prior art to the claims in this application and are not admitted to be prior art by inclusion in this section.

CUDA is a software platform for massively parallel high-performance computing on graphics processing units (GPU). A GPU is a parallel multi-core architecture and each core is capable of running thousands of threads simultaneously. Especially when an application program is designed for this architecture, the GPU can offer substantial performance benefits. CUDA development tools generally work alongside a conventional C/C++ compiler, so that programmers can use a variation of C program language to code algorithms for execution on the GPU. CUDA also hides the GPU architecture beneath application programming interface (API) and, as the result, application programmers are not required to be familiar with the architecture and the low level programming language. Instead, predefined graphics functions in the API can be called. Compiling a CUDA program, however, is not as straightforward as running a C compiler to convert source code into executable object code, partly because the CUDA program targets two different processor (CPU and GPU) architectures and partly because of the hardware abstraction of CUDA.

Although equipped with the conventional C/C++ compiler, the present CUDA environment does not support application programs that are written in a programming language that is for creating managed code to be executed under a virtual machine (such as Virtual Basic .NET). However, for programming convenience and security considerations, more and more applications are written in such a programming language. Moreover, there are also needs to executed a managed code-based application program in the CUDA environment so that the GPU computing resources can be utilized.

Before the managed code-based application program could access the GPU hardware resource, the application program needs to be translated into the corresponding GPU machine codes. However, such machine code translation can be inefficient without any support from the enhanced CUDA environment.

What is needed in the art is thus a method and system that can enable a managed code-based application program to access the resources of a GPU in the CUDA environment and can address at least the foregoing issues.

SUMMARY OF THE INVENTION

A method for enabling an intermediate code-based application program to access a target graphics processing unit (GPU) in a parallel processing environment is disclosed. The method includes the steps of compiling a source code of the intermediate code-based application program to an intermediate code, translating the intermediate code to a PTX instruction code, and translating the PTX instruction code to a machine code executable by the target GPU before delivering the machine code to the target GPU.

At least one advantage of the present invention is the intermediate code-based application program could be utilizing the multiple cores of the GPU in the enhanced CUDA parallel processing environment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
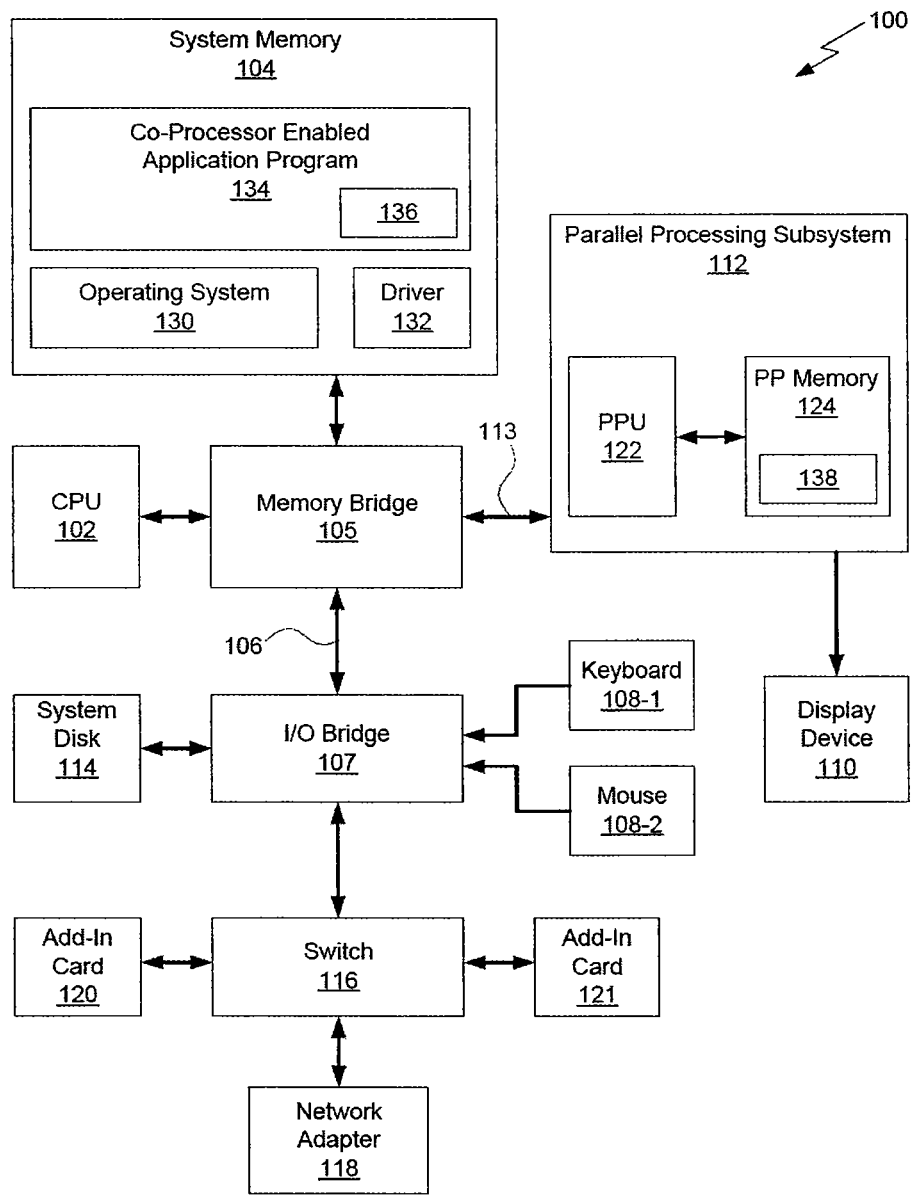
FIG. 1 is a simplified block diagram illustrating a host computer according to one embodiment of the present invention.

FIG. 1 is a block diagram illustrating a host computer 100 configured to implement one or more aspects of the present invention. Host computer 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a Hyper Transport link) to an I/O (input/output) bridge 107. The I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or Hyper Transport link). In one embodiment, parallel processing subsystem 112 is a graphics system within the host computer 100 that delivers pixels to a display device 110 (e.g., a conventional CRT or LCD based monitor). A system disk 114 is also connected to the I/O bridge 107. A switch 116 provides connections between the I/O bridge 107 and other components such as a network adapter 118 and various add-in cards 120 and 121. Other components (not explicitly shown), including USB or other port connections, CD drives, DVD drives, film recording devices, and the like, may also be connected to the I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, for example, using one or more integrated circuit devices such as programmable processors, application specific integrated circuits (ASICs), and memory devices. PPU 122 advantageously implements a highly parallel processor that includes one or more processing cores, each of which is capable of executing a large number of threads concurrently. PPU 122 can be programmed to perform a wide array of computations over various types of data. PPU 122 may transfer data from system memory 104 and/or PP memory 124 into internal memory (not shown) for processing. Results may be written to system memory 104 for access by other system components, such as the CPU 102. In some embodiments, PP subsystem 112 may include one PPU 122 operating as a graphics processor and a second PPU 122 configured to perform general-purpose computations. The PPUs 122 may be identical or different, and each PPU may have independent PP memory 124.

The CPU 102 operates as the control processor of the host computer 100, managing and coordinating the operation of other system components. In particular, CPU 102 issues commands that control the operation of PPU 122. In some embodiments, CPU 102 writes a stream of commands for PPU 122 to a command buffer (not shown), which may reside in system memory 104, PP memory 124, or another storage location accessible to both CPU 102 and PPU 122. PPU 122 reads the command stream from the command buffer and executes commands asynchronously with respect to the operation of CPU 102.

System memory 104 includes an executing image of an operating system 130, a driver 132, and a co-processor enabled application program 134. The operating system 130 provides the detailed instructions for managing and coordinating the operation of the host computer 100. The driver 132 provides detailed instructions for managing and coordinating operation of the parallel processing subsystem 112, and in particular the PPU 122. Furthermore, driver 132 provides compilation facilities for generating machine code specifically optimized for PPU 122. A co-processor enabled application program 134 incorporates instructions configured to execute on the CPU 102 and PPU functions 136 implemented in an abstract format, such as virtual PTX instruction, and configured to easily map to machine code for PPU 122. The machine code for PPU 122 may be stored in system memory 104 or in PP memory 124 as a set of PPU code fragments 138.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture. In yet another embodiment, the parallel processing subsystem 112 may be integrated with one or more other system elements, such as the memory bridge 105, CPU 102, and I/O bridge 107 to form a system on chip (SoC).

Figure 2:
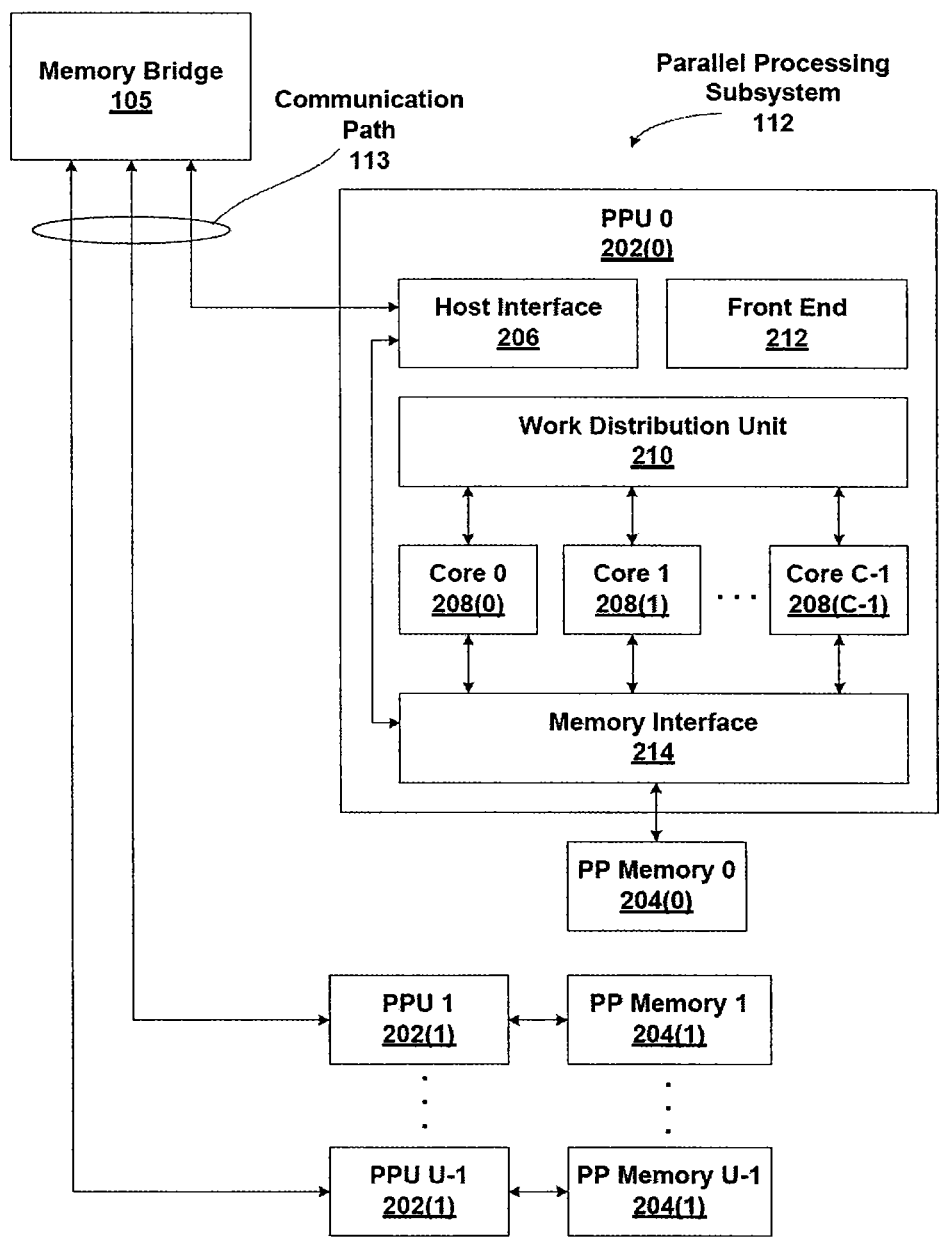
FIG. 2 is a simplified block diagram illustrating a parallel processing subsystem according to one embodiment of the present invention.

In conjunction with FIG. 1, FIG. 2 illustrates a parallel processing subsystem 112, according to one embodiment of the present invention. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the host computer 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem.

Some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of the host computer 100, controlling and coordinating operations of other system components. In particular, CPU 102 issues commands that control the operation of PPUs 202. In some embodiments, CPU 102 writes a stream of commands for each PPU 202 to a push buffer (not explicitly shown in FIG. 1), which may be located in system memory 104, PP memory 204, or another storage location accessible to both CPU 102 and PPU 202. PPU 202 reads the command stream from the push buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards 120 or 121 or peripheral devices might be supported. In some embodiments, switch 116 is eliminated, and network adapter 118 and add-in cards 120, 121 connect directly to I/O bridge 107.

The connection of PPU 202 to the rest of the host computer 100 may also vary. In some embodiments, PP system 112 is implemented as an add-in card that can be inserted into an expansion slot of the host computer 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory 204, including no local memory, and may use local memory 202 and system memory 104 in any combination. For instance, a PPU 202 can be a graphics processor in a unified memory architecture (UMA) embodiment; in such embodiments, little or no dedicated graphics (PP) memory 204 is provided, and PPU 202 would use system memory 104 exclusively or almost exclusively. In UMA embodiments, a PPU 202 may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Figure 3:
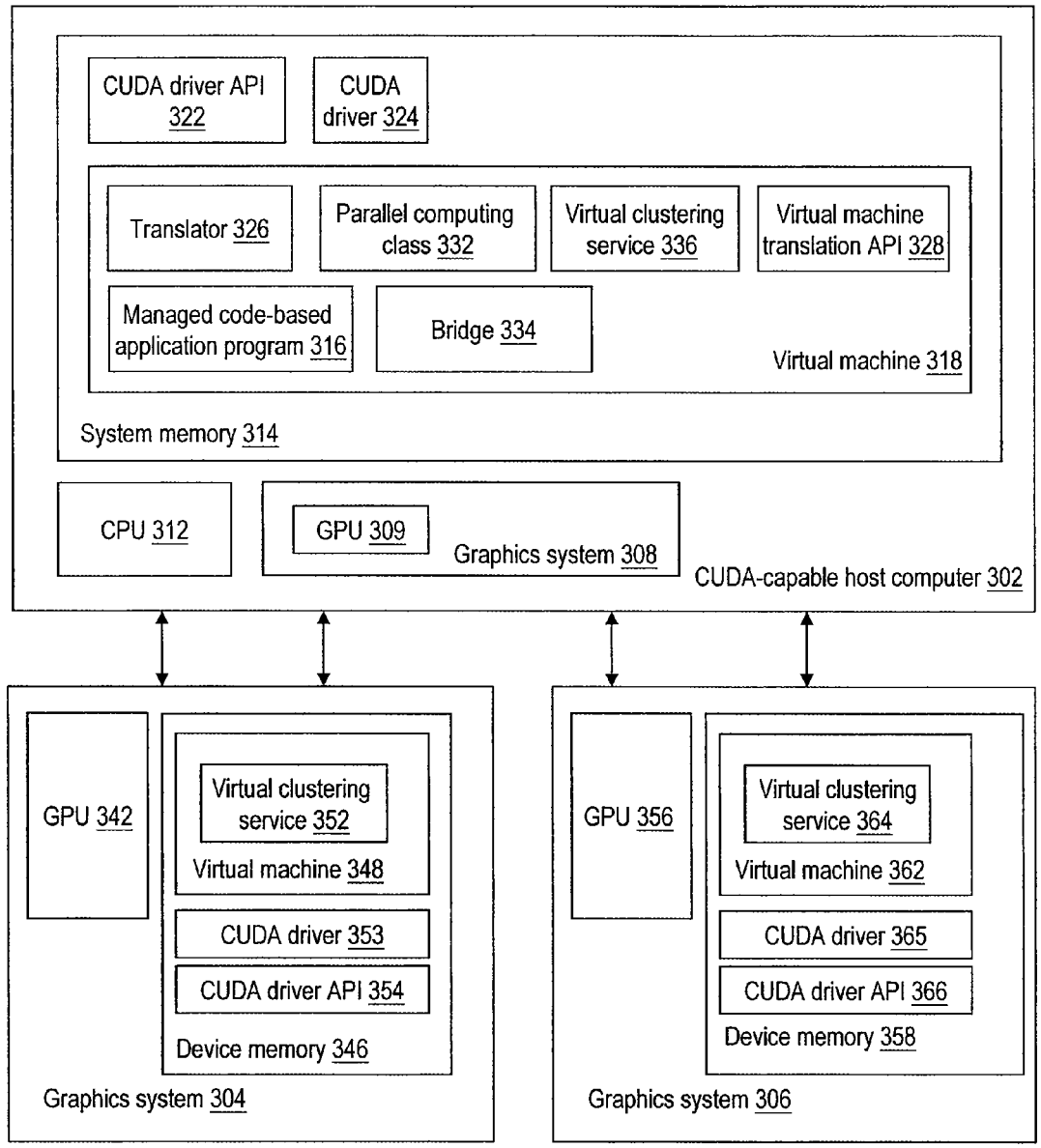
FIG. 3 is a simplified block diagram showing the CUDA-capable host computer in connection with graphics systems according to one embodiment of the present invention.

FIG. 3 is a simplified block diagram illustrating a CUDA-capable host computer 302 in connection with external graphics system 304 and 306 according to one embodiment of the present invention. The host computer 302 includes its own graphics system 308 as an example of the parallel processing subsystem 112 shown in FIG. 1. The host computer 302 further includes the CPU 312 for managing and coordinating the operations of the external graphics system 304 and 306 and internal graphics system 308. The internal graphics system 308 includes at least one GPU 309. The host computer 302 also comprises a system memory 314 a virtual machine with a managed code-based application program 316 therein. The host computer 302 is installed with a CUDA driver application programming interface (API) 322 and a CUDA driver 324. In one implementation, the virtual machine 318 also includes a translator 326, a virtual machine translation API 328, a parallel computing class 332, and a bridge 334, and a virtual clustering service 336. In yet another implementation, the translator 326 and the virtual machine translation API 328 is not part of the virtual machine 318. The parallel computing class 332, the bridge 334, and the virtual clustering service 336 are written in the managed code, and thus could be executed under the management of the virtual machine 318. It is worth noting that in the embodiment shown in FIG. 3, the virtual machine 318, CUDA driver API 322, CUDA driver 324, translator 326, virtual machine translation API 328, parallel computing class 332, bridge 334, and virtual machine clustering service 336 are software components.

Programs in any computer program language could be compiled into either the managed code or the unmanaged code. Unlike the unmanaged code, which is executed directly by the CPU, the managed code could be executed under the management of a virtual machine. The managed code that is not executed by the virtual machine and is further translated into hardware-specific machine code is referred to as intermediate managed code in the following paragraphs. The virtual machine is a software implementation of a machine that executes programs.

The external graphics system 304 includes a GPU 342 and device memory 346. The device memory 346 includes a virtual machine 348 storing a virtual machine clustering service 352, a CUDA driver 353, and a CUDA driver API 354. The external graphics system 304 could be connected to the host computer 302 in any well known manner. Another external graphics system 306 has a GPU 356 and device memory 358. The device memory 358 includes a virtual machine 362 also storing a virtual machine clustering service 364, another CUDA driver 365, and another CUDA driver API 366. It is worth noting that in the embodiment shown in FIG. 3, the virtual machines 348 and 362 and the virtual clustering services 352 and 364 are software components. It is also worth noting that the GPU 342 or 356 might correspond to any PPU (e.g., PPU 0) in FIG. 2. Meanwhile, the memory 346 or 358 may include the PP memory (e.g., PP memory 0) shown in FIG. 2.

In one implementation, the virtual clustering services 336, 352, and 364 are configured to be in communication with each other. The bridge 334 serves as an interface between the managed code-based application program 316 and the CUDA driver API 322. The managed code-based application program 316 might be written without incorporating any or all of the parallel computing class 332 and the virtual clustering service 336, 352, and 364. Even if no component is incorporated, the managed code-based application program 316 might still be able to access the GPU 309 of the host computer 302.

Figure 4:
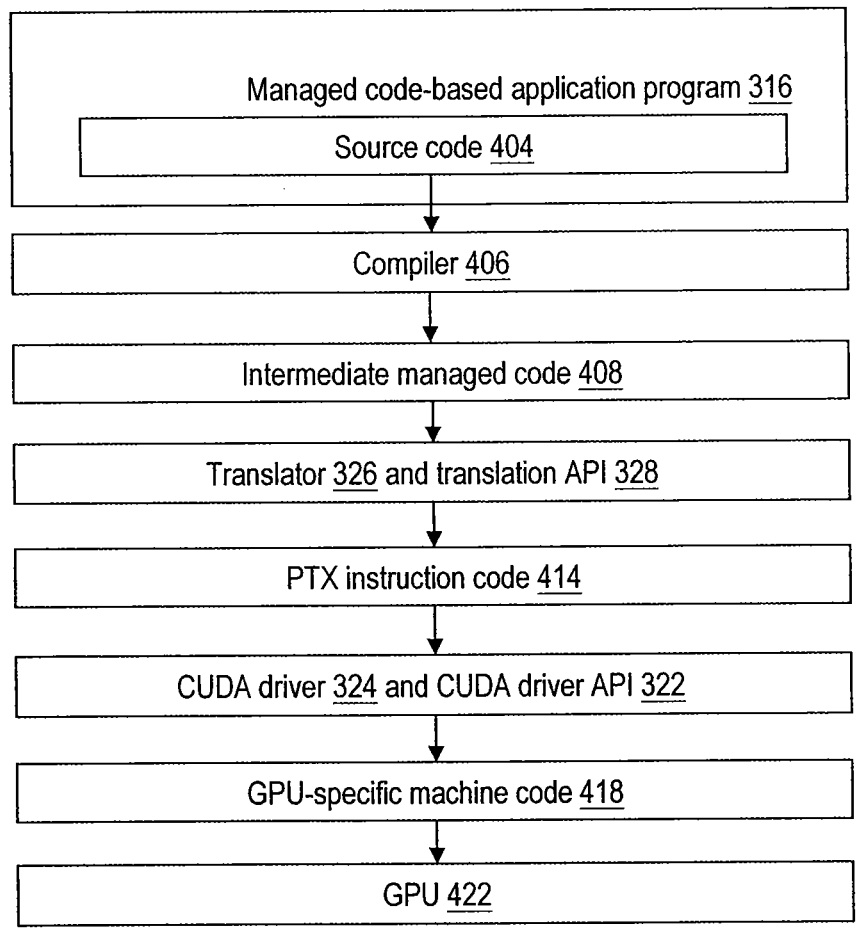
FIG. 4 is a schematic diagram showing how a managed code-based application program can access a GPU resource with the configuration shown in FIG. 3, according to one embodiment of the present invention.

In conjunction with FIG. 3, FIG. 4 is a schematic diagram showing how a managed code-based application program 316 can access the resources of a GPU, according to one embodiment of the present invention. Here, it should be noted that accessing the resources of a GPU by the application program 316 broadly refers to delivering instructions of the application program 316 to the GPU that can be executed directly by the GPU. Source code 404 of the managed code-based application program 316 is compiled into intermediate managed code 408 by a compiler 406. The translator 326 and the virtual machine translation API 328 further translate the intermediate managed code 408 into a parallel thread execution (PTX) instruction code. The PTX instruction code will be further translated into a corresponding GPU-specific machine code 418 by the CUDA driver 324 and the CUDA driver API 322. The translation from the intermediate code 408 to the PTX instruction code 414 starts with the virtual machine translation API 328 interpreting the meaning of the intermediate managed code 408 into objects. The translator 326 is configured to parse the objects before translating the intermediate managed code 408 into the PTX instruction code 414 and delivering the PTX instruction code 414 to the CUDA driver API 322 and the CUDA driver 324. In one implementation, the generation of the PTX instruction code 414 may come from the same application process for the execution of the managed code-based application program 316. In other words, the translation into the PTX instruction code 414 is performed during run time, and as such the PTX instruction code 414 could be dynamically loaded up even the application program 316 is still in the process of the execution. In an alternatively implementation, the generation of the PTX instruction code 414 is performed in an application process distinct from the process for the execution of the managed code-based application program 316.

The CUDA driver API 322 and the CUDA driver 324 translate the PTX instruction code 414 to GPU-specific machine code 418 that could be executed directly by the GPU 309. Through the translation from the intermediate managed code 408 to the GPU-specific machine code 418, the hardware resource of the GPU 309 may be utilized by the managed code-based application program 316.

Figure 5:
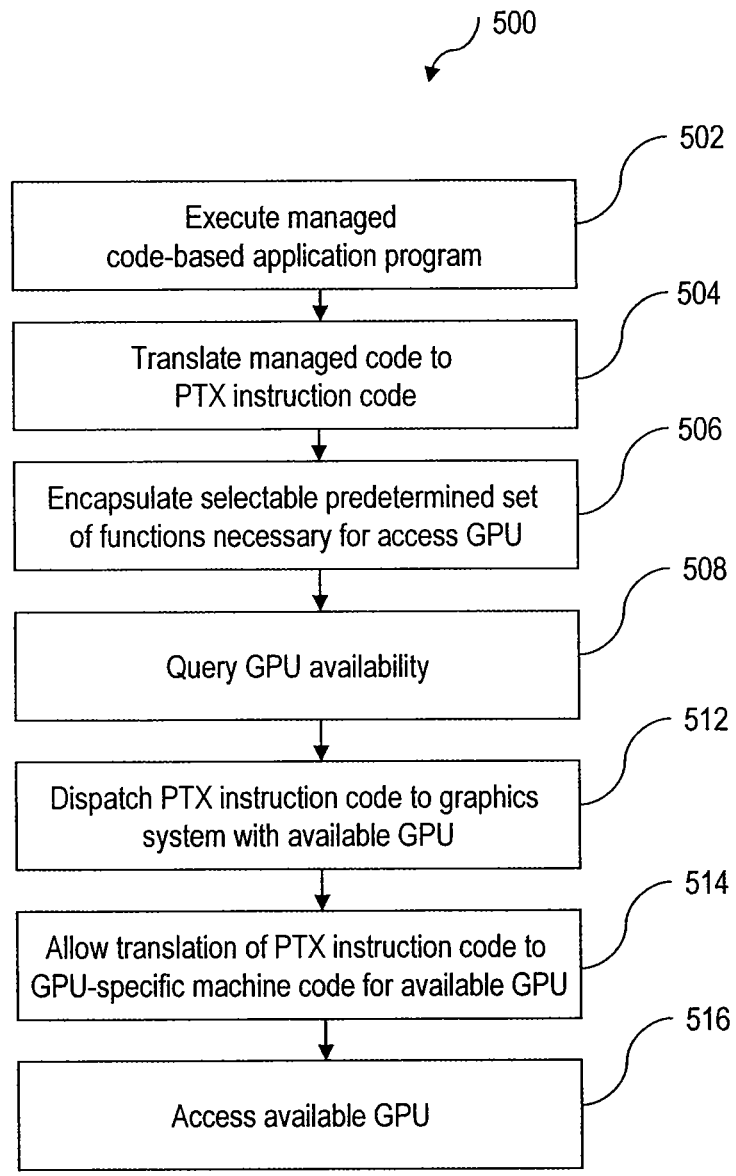
FIG. 5 is a flow chart illustrating a process that the host computer is configured to access GPU hardware resource in CUDA environment according to one embodiment of the present invention.

In conjunction with FIGS. 3 and 4, FIG. 5 is a flow chart illustrating a process 500 that the host computer 302 is configured to access external GPU resources in the CUDA environment according to one embodiment of the present invention. In step 502, the virtual machine 318 of the host computer 302 executes the intermediate managed code 408 of the managed code-based application program 316 through the management and coordination of the CPU 312. In step 504, after the compile of the source code 404 into the intermediate managed code 408 the translator 326 translates the intermediate managed code 408 to the PTX instruction code 414. It is worth noting that in CUDA environment the compile of the source code 404 to the intermediate managed code 408 is performed by a managed code compiler (not shown in FIG. 3). As discussed above, the generation of the PTX instruction code could be dynamically performed in the same application process of the execution of the managed code-based application program 316, or alternatively, performed in a different application process. In step 506, the host computer 302 is further configured to encapsulate a set of selectable functions that are necessary for the access to the GPU 309, 342, or 356. The selectable functions are to be performed on the PTX instruction code 414 by the invoking of the corresponding calls provided by the CUDA driver API 322. In one implementation, the selectable functions includes initialization of CUDA driver 324 for the PTX instruction code 414, loading of the PTX instruction code 414 after the translation of the intermediate managed code 408, allocation of the memory space (system memory 314 and device memories 346 and 358) for the transfer of parameters associated with the PTX instruction code 414, configurations of types of those parameters, and the transfer of those parameters to the allocated memory space. In one implementation, the set of selectable functions is encapsulated into an object. The object with the encapsulated set of selectable functions could be dispatched to the external graphics system 304 or 306 for further processing. Moreover, the object could be incorporated into the managed code-based application program 316 directly as well. It is worth noting that the parallel computing class 332 is extendable, at least meaning additional sets of selectable functions could be added into the parallel computing class 332. As such, the managed code-based application program 316 becomes more object-oriented in nature.

In step 508, the virtual clustering service 336 queries the availability of the GPU 342 through communicating with the virtual clustering service 352 of the external graphics system 304 having the GPU 342. The virtual clustering service 352 checks the availability of the GPU 342, such as the availability of the number of the cores in the GPU 342, before responding to the query issued from the virtual clustering service 336. In step 512, once after the virtual clustering service 336 obtains the information about the availability of the GPU 342, the parallel computing class 332 delivers the PTX instruction code 414 to the virtual clustering service 352. In step 514, the host computer 302 then allows the virtual clustering service 352 to further feed the received PTX instruction code to the CUDA driver API 354 and the CUDA driver 353, so that the CUDA driver API 354 and the CUDA driver 353 could translate the PTX instruction code to the GPU-specific machine code for the GPU 342. As such, the managed code-based application program 316 could access the GPU 342 in step 516. It is worth noting that the operation 500 provides the managed code-based application program 316 with an opportunity to utilize the resources of the GPU 342, even though the application program 316 is not specifically written to access the GPU 342.

Although not shown in FIG. 3, both external graphics systems 304 and 306 further have their own bridges that are the same or similar to their counterpart 334 for interfacing the PTX instruction codes and the CUDA driver API 354 and 366.

Figure 6:
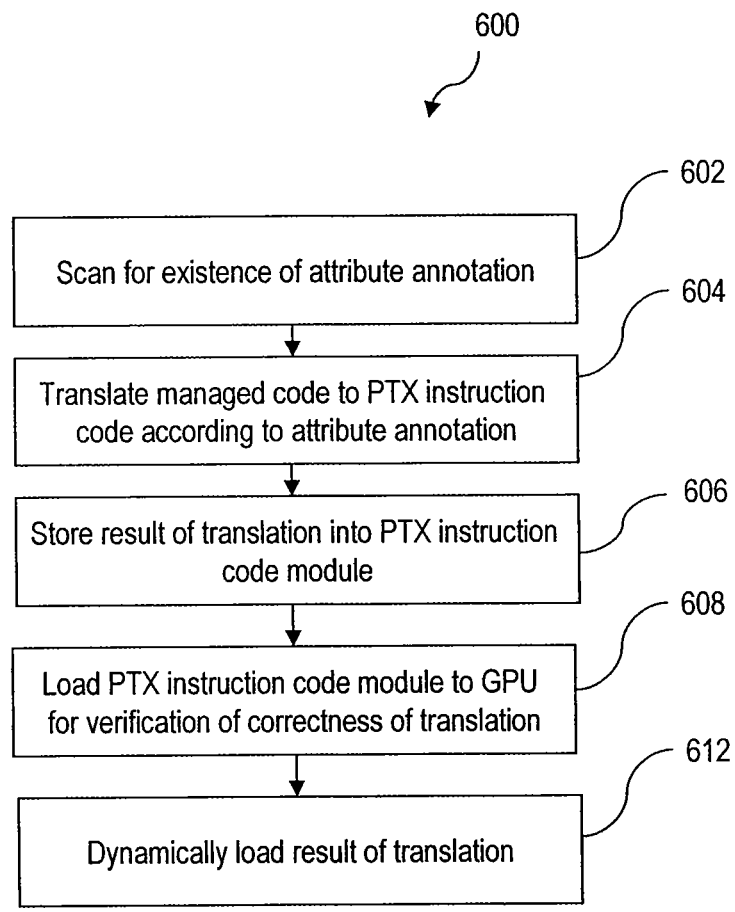
FIG. 6 is a flow chart illustrating a process performed by the host computer for preparation of the PTX instruction code according to one embodiment of the present invention.

In conjunction with FIGS. 3 and 4, FIG. 6 is a flow chart illustrating a process 600 for the preparation of the PTX instruction code 414 according to one embodiment of the present invention. Managed code-based programming generally allows for program-level attribute annotation indicative of the way the annotated part of the programming code should be implemented. The attribute annotation could be compiled along with the source code 404 and referenced during run time of the application program 316. The result of the compile, which includes the intermediate manage code 408 and the attributes associated with the attribute annotations, is stored into a file. In one implementation, the file is an executable (.exe) file. In yet another implementation, the file is a dynamic-link library (.dll) file. Such file will be loaded during or before run time. In step 602, the translator 326 is configured to scan the content of the loaded file for the existence of the attribute annotation associated with a part of the source code 404 or even a variable in the part of the source code 404. In step 604, the translator 326 may determine which part of the intermediate managed code 408 should be translated and translates it accordingly. As for the result of the translation, the CUDA driver 324 stores the result of the translation into a file for the future use in step 606. In one implementation, the file that stores the result of the translation is a CUBIN file. It is worth noting that the CUBIN file comprises the PTX instruction code 414 and the data to be processed by the GPU.

In step 608, the CUDA driver 324 is configured to independently load the file into the GPU for the debugging and verification of the translation. Alternatively, the CUDA driver 324 might not store the result of the translation. Rather, the CUDA driver 324 dynamically loads the result of the translation over the course of the execution of the managed code-based application program 316 in step 612.

The above description illustrates various embodiments of the present invention along with examples of how aspects of the present invention may be implemented. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips, or any type of solid-state non-volatile semiconductor memory) on which information is permanently stored; and (ii) writable storage media (e.g., floppy disks within a diskette drive, CD-RW disks, DVD-RW disks, flash memory, hard-disk drive, or any type of solid-state random-access semiconductor memory) on which alterable information is stored. The above examples, embodiments, instruction semantics, and drawings should not be deemed to be the only embodiments, and are presented to illustrate the flexibility and advantages of the present invention as defined by the following claims.

I claim:

1. A method for preparing a PTX instruction code to enable an intermediate code-based application program to access a target graphics processing unit (GPU) in a parallel processing environment, comprising:
   scanning for an attribute annotation associated with a section of a source code for the intermediate code-based application program;
   translating the section of the source code to the PTX instruction code for the target GPU according to the attribute annotation; and
   causing a virtual clustering service associated with a host computer to query availability of the target GPU through communicating with a virtual clustering service associated with a graphics system that comprises the target GPU.

2. The method of claim 1, further comprising verifying correctness of a result from the translating step by loading the result to the target GPU in a first application process.

3. The method of claim 2, further comprising storing the result into a file before loading the file to the target GPU.

4. The method of claim 2, further comprising loading the result to the target GPU in a second application process, wherein the second application process is an application process during which the intermediate code-based application program is executed.

5. The method of claim 2, wherein the result comprises the PTX instruction code and data associated with the PTX instruction code.

6. The method of claim 1, further comprising compiling the source code and the attribute annotation associated with the source code prior to the scanning step.

7. The method of claim 1, wherein an intermediate code associated with the intermediate code-based application program is a managed code.

8. The method of claim 1, wherein the PTX instruction code is a Parallel Threaded Execution (PTX) code.

9. A parallel processing-capable computer system for enabling an intermediate code-based application program to access a target graphics processing unit (GPU), comprising:
   a first graphics system comprising:
      the target GPU; and
      a device memory comprising a first virtual machine; and
   a host computer that is in communication with the first graphics system, comprising a system memory and a second virtual machine, wherein the system memory comprises:
      a compiler for compiling a source code of the intermediate code-based application program along with an attribute annotation associated with a section of the source code; and
      a translator for scanning for the attribute annotation, and translating the section of the source code to a PTX instruction code according to the attribute annotation;
   wherein the first virtual machine comprises a first virtual clustering service and the second virtual machine comprises a second virtual clustering service, and wherein the second virtual clustering service is configured to query the availability of the target GPU by communicating with the first virtual clustering service.

10. The computer system of claim 9, wherein the system memory further comprises a parallel processing-capable driver for loading a translation result to the target GPU in a first application process, so as to verify correctness of the translation result.

11. The computer system of claim 10, wherein the parallel processing-capable driver stores the translation result into a file before loading the file to the target GPU.

12. The computing system of claim 10, wherein the parallel processing-capable driver further loads the translation result to the target GPU in a second application process, wherein the second application process is an application process during which the intermediate code-based application program is executed.

13. The computing system of claim 10, wherein the translation result comprises the PTX instruction code and data associated with the PTX instruction code.

14. The computing system of claim 9, wherein an intermediate code associated with the intermediate code-based application program is a managed code.

15. The computing system of claim 9, wherein the PTX instruction code is a Parallel Threaded Execution (PTX) code.

16. A non-transitory computer-readable medium containing a sequence of instructions executable within a computer system including a host computer having a processing unit and a physical memory, wherein the sequence of instructions, when executed by the processing unit, causes the processing unit to:
- compile a source code of an intermediate code-based application program and an attribute annotation associated with a section of the source code;
- scan for the attribute annotation; and
- translate the section of the source code to a PTX instruction code according to the attribute annotation; and
- cause a virtual clustering service associated with the host computer to query availability of a target GPU through communicating with a virtual clustering service associated with a graphics system that comprises the target GPU.

17. The computer-readable medium of claim 16, further comprising a sequence of instructions when executed by the processing unit causes the processing unit to load a translation result to a target GPU in a first application process.

18. The computer-readable medium of claim 17, further comprising a sequence of instructions when executed by the processing unit causes the processing unit to store the translation result into a file before loading the file to the target GPU.

19. The computing-readable medium of claim 17, further comprising a sequence of instructions when executed by the processing unit causes the processing unit to load the translation result to the target GPU in a second application process, wherein the second application process is an application process during which the intermediate code-based application program is executed.

* * * * *